DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED OCTOBER 5, 1976

951 O.G. 7

T951,007

COMPOSITIONS HAVING GOOD HYDROLYTIC STABILITY AND IMPROVED STRENGTH PROPERTIES

Robert Koncos, 257 St. Clair Drive, Moorestown, N.J. 08057, and Irving Tashlick, 675 Ocean Ave., Long Branch, N.J. 07740

Continuation of abandoned application Ser. No. 487,119, July 10, 1974. This application Oct. 20, 1975, Ser. No. 618,875

Int. Cl.[2] C08G *18/62*

U.S. Cl. 260—*75* NP

No Drawing. 26 Pages Specification

Polyurethane compositions having good hydrolytic stability and improved strength properties are prepared by reacting polyester polyols or polyether polyols with polyisocyanates in the presence of about 5 to 40%, based on the total weight of reactants, of a polyhydroxyl-containing diene polymer. Conventional reaction procedures are employed.